UNITED STATES PATENT OFFICE 2,659,711

CHELATE POLYMERS FROM TETRAKETONES

John P. Wilkins, Grand Island, Buffalo, N. Y., and Emerson L. Wittbecker, West Chester, Pa., assignors to E. I. du Pont de Nemours & Company, Wilmington, Del., a corporation of Delaware No Drawing. Application August 22, 1951, Serial No. 243,186

9 Claims. (Cl. 260—63)

This invention relates to a new class of condensation polymers and more particularly to new chelate polymers of certain metal derivatives of tetraketones.

An object of the present invention is the preparation of synthetic organometallic polymers by reacting a tetraketone with a compound of a metal having a principal valence of two and a coordination number of four. A further object of the invention is to provide a new class of such synthetic organometallic polymers. Additional objects of the invention will become apparent from the following description and claims.

In accordance with the present invention it has been found that a new class of polymers suitable for the formation of molded articles, fibers and films may be prepared by reacting a bis-(1,3-diketone) R compound, in which R is a divalent hydrocarbon radical at least four carbon atoms in length separating the two 1,3-diketone functional groups of the tetraketone, with a compound of a metal having a principal valence of two and a coordination number of four, e. g., a salt of such a metal and an organic or inorganic acid, preferably a salt of such a metal and the enol form of a 1,3 diketone when the tetraketone is capable of forming a stronger enolate than the diketone. The reaction may be performed by melting the reactants together and heating until the desired polymerization is obtained, or the reactants may be heated in a mutual solvent, usually under reflux to avoid loss of solvent.

Suitable tetraketones are illustrated by the following general structural formulae:

(1) 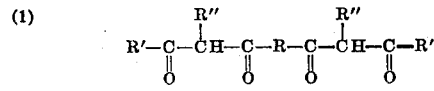

(2) 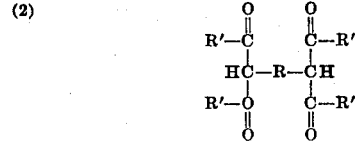

wherein R is a divalent hydrocarbon radical at least four carbon atoms in length, R' is a monovalent hydrocarbon group, and R" is hydrogen or a monovalent hydrocarbon group. Preferably, either R or R' should be aromatic in character.

It is well known that hydrocarbon radicals joined by an ether linkage act like simple hydrocarbons in most chemical reactions and, for the purposes of this invention, such compounds are the equivalent of the aromatic or aliphatic radicals defined above, and are to be construed as within the scope of the invention.

Suitable examples of aromatic R groups are phenylene, biphenylene, oxydiphenylene, xylylene, naphthylene, ethylene bis-phenylene, ethylene bis-diphenylene and higher members of this series. Aliphatic radicals suitable as R groups are tetramethylene, pentamethylene, hexamethylene, octamethylene, decamethylene, dodecamethylene, and hydrocarbon substituted radicals of this type. R' may be any monovalent hydrocarbon group, such as phenyl, tolyl, naphthyl, xylyl, benzyl, methyl, ethyl, butyl, cyclohexyl, and the like.

The above bis-(1,3-diketone) R compounds form highly stable neutral coordinate or inner complex compounds with metals having a coordination number which is twice a principal valence. For the preparation of linear, neutral polymeric structures from these tetraketones metals having a principal valence of two and a coordination number of four are required.

Metals which have a primary valence of two and a coordination number of four are beryllium, copper, nickel, zinc, cobaltous cobalt, ferrous iron, palladous palladium, manganous manganese, calcium, strontium, barium and cadmium. In accordance with this invention these metals are used in the form of compounds, such as the metal hydroxides and metal salts of organic and inorganic acids, for the preparation of linear polymers from the tetraketones. Examples of suitable salts are beryllium basic acetate, zinc nitrate and barium cyanide. The acetylacetonates and the aceto-acetic ester complexes of any of the above metals are especially preferred because acetylacetone or acetoacetic ester is liberated in the condensation reaction and inorganic by-products, which are difficult to remove from the chelate polymers, are avoided. This exchange reaction works well as long as the tetraketone forms a stronger enolate than acetylacetone. The tetraketones containing an aromatic group satisfy this requirement. The completely aliphatic tetraketones should be polymerized with the metal hydroxide or salt since their tendency to enolize is no stronger than acetylacetone.

The product of the above described reaction between a beryllium salt and a tetraketone corresponding to one of the two types of general formulae above is a chelate polymer of one of the following molecular structures, depending upon which type of tetraketone monomer is used:

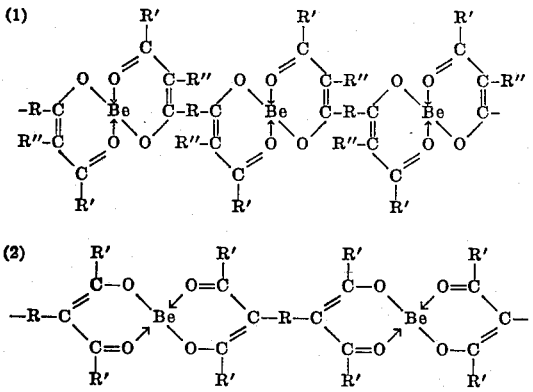

Similar structures are obtained with the other metals having a coordination number of four and a primary valence of two. The metal atom in the polymer chain is tetrahedral and the chain, therefore, contains a plurality of recurring spirane type symmetrical units in which the planar configurations of the adjoining rings are perpendicular to one another. The tetraketone monomer must be considered to have two functional groups, each being a 1,3 diketone group separated by the appropriate R group. The enol form of each of the functional groups reacts as an acid and forms a salt with the metal. The metal atom having two ionic valences combines with two enol groups to form the salt. The carbonyl oxygens in the vicinity of the metal atom also become attached to it through coordinate covalences to form an exceedingly stable union. Accordingly the recurring units of the polymers of this invention are represented by the following benzenid-type formula wherein M is a metal having a primary valence of two and a coordination number of four, and the other symbols are as defined previously:

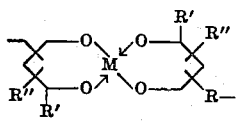

The following examples, not to be construed as limitative, and in which parts are by weight unless otherwise specified, illustrate means for preparing the new polymers of this invention. While the examples describe the preparation of beryllium containing polymers, it is to be understood that the illustrated techniques may be applied to the preparation of similar polymers from tetraketones and the heretofore mentioned metals.

*Example 1*

Preparation of terephthalyldiacetone: To 276 parts of powdered sodium in 1500 parts of ethyl acetate was added a solution of 486 parts of p,p'-diacetylbenzene in ethyl acetate. The reaction is exothermic and the temperature was kept at 45° C. through the use of an ice bath. After stirring for several hours and then standing overnight, the reaction mixture was added slowly to 15,000 parts of water. The crude terephthalyldiacetone product in the form of its disodium enolate was recovered from the water layer by acidification with acetic acid. The terephthalyldiacetone, which formed a yellow precipitate, was washed with water and air dried. A yield of 585 parts (79% of the theoretical) was obtained. This product was dissolved in acetone and treated with a decolorizing charcoal and recrystallized. A subsequent recrystallization from chloroform yielded a product which melted at 185° C.–186° C.

Chelate polymer from terephthalyldiacetone: Two hundred and forty-six parts of terephthalyldiacetone and 207 parts of beryllium acetylacetonate were melted together and held at 218° C. with stirring. Acetylacetone was distilled from the mixture, which became increasingly viscous. After a short time the polymeric mass solidified to a material insoluble in boiling phenol or boiling dimethylformamide and having a melting point in excess of 295° C.

*Example 2*

Preparation of chelate polymer from 4,4'-bis-(acetoacetyl) diphenyl ether: The tetraketone, 4,4'-bis(acetoacetyl) diphenyl ether, was prepared in the manner described in Example 1 by condensing ethyl acetate with 4,4'-diacetyldiphenyl ether in the presence of sodium. After recrystallization from ethanol and from ethanol-acetone mixture, the tetraketone product melted at 152°–153.5° C.

ANALYSIS

|  | Carbon, percent | Hydrogen, percent |
|---|---|---|
| Calculated for $C_{20}H_{18}O_5$ | 71 | 5.34 |
| Actually found | 71.79 | 5.60 |

Three hundred and thirty-eight parts of this tetraketone and 207 parts of beryllium acetylacetonate were melted together and heated at 218° C. for a half hour with stirring. The molten mixture bubbled rapidly and acetylacetone distilled out. As the polymeric mass became viscous, the heating was continued at about 260° C. After the mass became too viscous for stirring, the heating was discontinued and an orange-colored brittle polymer was obtained. This chelate polymer is soluble in methanol/chloroform mixtures and has a stick temperature of 197° C.

*Example 3*

Chelate polymer from 1,8-bis(benzoylacetyl) octane: This tetraketone may be prepared by condensing two mols of acetophenone with 1 mol of diethyl sebacate in the presence of sodium methylate as catalyst.

Two hundred five parts of 1,8-bis (benzoylacetyl) octane and 104 parts of beryllium acetylacetonate were melted together and heated at 218° C. for two hours at atmospheric pressure and then for an additional five hours under vacuum. Acetylacetone distilled off rapidly as the mixture became fairly viscous. When the vacuum was released, the polymer solidified. It was orange in color and was soluble in orthocresol. It was melt-spun into fibres which were somewhat brittle. The melt polymerization of this tetraketone with beryllium basic acetate at 218° C. for one hour at atmospheric pressure and under vacuum for six hours gave a similar polymer.

*Example 4*

Four hundred six parts of 1,8-bis (benzoylacetyl) octane and 102 parts of basic beryllium acetate were refluxed in toluene for several hours.

A clear colorless soft polymer was isolated by evaporating the toluene in vacuo.

Example 5

Chelate polymer from β,β,β',β'-tetraacetyldiethylbenzene: This tetraketone is prepared by condensing one mol of xylylene dibromide with two mols of the sodium enolate of acetylacetone.

Three hundred and two parts of β,β,β',β'-tetraacetyl-p-diethylbenzene and 267 parts of beryllium acetoacetic ethyl ester complex are melted together and heated at 218° C. for an hour at atmospheric pressure and then for an additional five hours under vacuum. Ethyl acetoacetate distills off rapidly and the residue thickens. A light orange polymer solidifies upon release of vacuum and cooling. The polymer may be press spun into monofilaments which are somewhat brittle. The polymer may be molded into objects by the application of heat and pressure.

The high melting polymers of this invention are prepared from tetraketones in which the keto groups are paired in 1,3 relationship. Those with the highest melting point contain aromatic hydrocarbon groups of six to fourteen carbon atoms in the polymer chain, such as those in Examples 1, 2 and 5. Polymers having a lower melting point are prepared from tetraketones in which the two functional 1,3-diketone groups are separated by aliphatic groups of four to twelve carbon atoms, such as the polymers of Examples 3 and 4. The melting point is also a function of the metal involved.

The polymer from terephthalyldiacetone by chelation with beryllium is essentially intractable. Its melting point may be lowered and its solubility increased by copolymerizing terephthalyldiacetone with another tetraketone, particularly one in which the two functional groups are separated by an aliphatic hydrocarbon radical.

Polymers prepared at relatively low temperatures by solution polymerization techniques are generally lower in molecular weight and melting point, and are softer. These lower molecular weight polymers are particularly useful in coating compositions.

The new polymers of this invention are characterized by their stability at high temperatures. The application of heat for extended periods does not induce chemical decomposition of the polymer at temperatures below 300° C. The polymers are not affected by common solvents and are resistant to attack by dilute acids and bases. They can be shaped into molded articles, fibers, and films by standard molding, spinning and casting technique.

A majority of the polymers are colored. The colors are characteristic of the metal used and to some extent depend also on the tetraketone involved. The high stability of these colored materials makes them suitable for coloring polymeric materials which are shaped into articles at high temperatures.

As many apparently widely different embodiments of this invention may be made without departing from the spirit and scope thereof, it is to be understood that the invention is not limited to the specific embodiments thereof except as defined in the appended claims.

What is claimed is:

1. A solid chelate condensation polymer having a linear chain of a plurality of recurring spirane type symmetrical units represented by the following general formula in which, for the purpose of illustrating the linkages, two of the plurality of recurring units are shown:

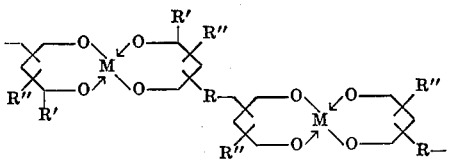

wherein R is a divalent hydrocarbon radical at least four carbon atoms in length, R' is a monovalent hydrocarbon group, R" is selected from the group consisting of hydrogen and monovalent hydrocarbon radicals, and M is a metal having a primary valence of two and a coordination number of four selected from the group consisting of beryllium, copper, nickel, zinc, cobaltous cobalt, ferrous iron, palladous palladium, manganous manganese, calcium, strontium, barium, and cadmium.

2. A polymer as defined in claim 1 in which M represents a beryllium atom.

3. A polymer as defined in claim 1 in which one of the groups represented by R and R' is aromatic.

4. The process for forming a chelate condensation polymer which comprises reacting a bis-(1,3-diketone) R compound, in which R is a divalent hydrocarbon radical at least four carbon atoms in length separating the two 1,3-diketone functional groups, with a compound of a divalent metal selected from the group consisting of beryllium, copper, nickel, zinc, cobaltous cobalt, ferrous iron, palladous palladium, manganous manganese, calcium, strontium, barium and cadmium.

5. A process as defined in claim 4 in which the metal compound is a beryllium salt.

6. The process for forming a chelate condensation polymer which comprises reacting a tetraketone represented by the general formula,

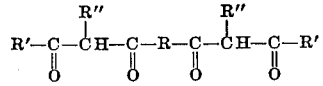

where R is a hydrocarbon radical at least four carbon atoms in length, R' is a monovalent hydrocarbon group, and R" is selected from the group consisting of hydrogen and monovalent hydrocarbon radicals with a salt of a divalent metal selected from the group consisting of beryllium, copper, nickel, zinc, cobaltous cobalt, ferrous iron, palladous palladium, manganous manganese, calcium, strontium, barium and cadmium.

7. The process for forming a chelate condensation polymer which comprises reacting a tetraketone represented by the general formula,

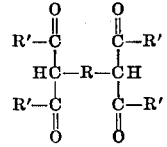

where R is a hydrocarbon radical at least four carbon atoms in length and R' is a monovalent hydrocarbon group, with a salt of a divalent metal selected from the group consisting of beryllium, copper, nickel, zinc, cobaltous cobalt, ferrous iron, palladous palladium, manganous manganese, calcium, strontium, barium and cadmium.

8. The process for forming a chelate condensation polymer which comprises reacting a tetraketone represented by the general formula,

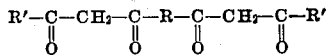

where R is a hydrocarbon radical at least four carbon atoms in length, and R' is a monovalent hydrocarbon group and the tetraketone contains an aromatic group, with a beryllium salt of the enol form of a 1,3 diketone.

9. The process for forming a chelate condensation polymer which comprises reacting a tetraketone represented by the general formula,

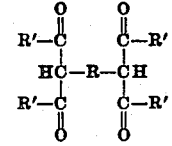

where R is a hydrocarbon radical at least four carbon atoms in length, R' is a monovalent hydrocarbon group and the tetraketone contains an aromatic group, with a beryllium salt of the enol form of a 1,3 diketone.

JOHN P. WILKINS.
EMERSON L. WITTBECKER.

No references cited.